Patented Feb. 5, 1935

1,989,951

UNITED STATES PATENT OFFICE 1,989,951

SYNTHETIC RESIN AND PROCESS OF MAKING THE SAME

Otto Süssenguth, Erkner, near Berlin, Germany, assignor to Bakelite Gesellschaft mit beschrankter Haftung, Berlin, Germany No Drawing. Application December 4, 1931, Serial No. 579,113. In Germany December 12, 1930

4 Claims. (Cl. 260—4)

Pure phenol-aldehyde resins often show the disadvantage of darkening by the action of light and therefore cannot be used for the preparation of light-resistant white molding mixtures. It has been attempted to increase light resistance by the condensation of phenol with excess formaldehyde; also in order to obtain light-resistant products phenol has been reacted with acetone and the resulting dimethyl-diphenylolmethane condensed with formaldehyde. The resins thus obtained, however, do not fulfill the requirements as to light resistance.

It has now been found that resins of great light resistance can be obtained if phenol and acetone are heated with formaldehyde by using basic catalysts, and the resin obtained is mixed with a suitable quantity of acid. Organic acids, for example, lactic acid, phthalic acid or citric acid, and inorganic acids, for example phosphoric acid or sulphuric acid, or acid-reacting substances, for example sodium bisulphate, may be used for this purpose. The well known reaction between phenol and acetone does not occur under these conditions, but instead acetone and phenol and formaldehyde react together to form a new resinous product. The product differs materially in time of hardening and resistance to light from that obtained if acetone is reacted with formaldehyde and phenol is reacted with formaldehyde, and the resulting resins then melted together; it differs also from the resinous product forming from dimethyl-diphenyl-methane and formaldehyde.

The resin obtained according to the present invention is soluble in acetone and wood alcohol. It is readily hardenable, elastic and light-resistant. It may be exposed for some time to comparatively high temperatures, for example 180°, and darkening is not noticed. This property renders the resin suitable especially for light-colored, light-resistant molding mixtures as well as for the preparation of light lacquers, impregnating agents and the like.

In preparing this resin, other ketones than acetone may be used, for example cyclohexanone, benzo-phenone or their mixtures. Instead of carbolic acid one may use other phenols, for example cresol or resorcin or mixtures of several phenols. Instead of aqueous formaldehyde one may use solid polymers of the formaldehyde, for example trioxymethylene or paraformaldehyde, or compounds separating formaldehyde, for example, anhydro-formaldehyde-aniline or hexamethylene-tetramine. Resin formation may be accomplished also by the application of heat and pressure.

As catalysts may be used alkalies, for example potassium hydroxide or sodium hydroxide, furthermore ammonia, alkaline-reacting compounds, for example alkaline-reacting salts, for example sodium carbonate or sodium sulfite, aniline, urea etc.

Example 1

| | |
|---|---|
| Phenol | 600 grams |
| Acetone | 200 grams |
| Paraform | 600 grams |
| Soda lye (10%) | 40 ccm | are heated for two hours under a reflux condenser. Heating is then continued for a short time without the reflux in order to drive off the water of reaction. The temperature rises to approximately 115°–125°. Heating without the reflux may also be applied under a partial vacuum. Five grams citric acid is added to the slightly yellow-colored, somewhat soft resin to lighten the color. The resin is mixed with fillers in the usual manner and molded by the application of heat and pressure.

Example 2

| | |
|---|---|
| Phenol | 600 grams |
| Cyclo-hexanone | 300 grams |
| Formaldehyde solution (40%) | 1200 grams |
| Soda lye (10%) | 40 ccm | are heated for several hours to boiling point. The resin is mixed with 5 gr. of phosphoric acid. The separated resin is dehydrated by rapid heating to 110–120°. It can be worked in the usual manner into lacquers or molding mixtures.

I claim:

1. Method of preparing a resin from a phenol of improved light resistance and reactivity under the action of heat which comprises reacting a phenol with an aldehyde and a ketone in the presence of a basic contact agent until a resinous condensation product is obtained, and thereafter acidifying to yield a product that is elastic, readily hardenable by heat and does not darken appreciably in color when heated to 180° C.

2. Method of preparing a resin from a phenol of improved light resistance and reactivity under the action of heat which comprises reacting in the presence of a basic contact agent a phenol with an aldehyde and a ketone, the aldehyde and the ketone constituting the greater proportion by weight of the mixture, until a resinous condensation product is obtained, and thereafter acidifying to yield a product that is elastic, readily hardenable by heat and does not darken appreciably when heated to 180° C.

3. Composition comprising the resinous reaction product of a phenol with an aldehyde and a ketone in the presence of a basic contact agent and thereafter acidified, said resin being characterized by elasticity, readily hardening under the action of heat and not darkening appreciably in color when heated to 180° C.

4. Composition comprising the resinous reaction product of a phenol with a greater proportion by weight of an aldehyde and a ketone in the presence of a basic contact agent and thereafter acidified, said resin being characterized by elasticity, readily hardening under the action of heat and not darkening appreciably in color when heated to 180° C.

OTTO SÜSSENGUTH.